United States Patent [19]
Eisenhour

[11] Patent Number: 5,832,990
[45] Date of Patent: Nov. 10, 1998

[54] AUTOMATIC TEMPERATURE CONTROL METHOD AND APPARATUS FOR AN AUTOMOTIVE VEHICLE

[75] Inventor: Ronald S. Eisenhour, Phoenix, Ariz.

[73] Assignee: Nissan Research & Development, Inc., Farmington Hills, Mich.

[21] Appl. No.: 565,345

[22] Filed: Nov. 30, 1995

[51] Int. Cl.⁶ .................................................. F25B 29/00
[52] U.S. Cl. ........................... 165/202; 165/42; 165/43; 236/91 C; 236/91 F; 236/49.3
[58] Field of Search .................. 236/91 C, 91 F, 236/13, 49.3; 165/42, 43, 202

[56] References Cited

U.S. PATENT DOCUMENTS

| | | | |
|---|---|---|---|
| 4,419,730 | 12/1983 | Ito et al. | 364/424 |
| 4,487,254 | 12/1984 | Hayashibara | 165/42 |
| 4,580,620 | 4/1986 | Fukumoto et al. | 165/42 |
| 4,744,511 | 5/1988 | Kakehi et al. | 236/13 |
| 4,757,944 | 7/1988 | Kagohata et al. | 236/91 F |
| 4,901,788 | 2/1990 | Doi | 165/24 |
| 4,919,195 | 4/1990 | Tanino | 165/43 |
| 5,156,204 | 10/1992 | Doi | 165/17 |
| 5,190,096 | 3/1993 | Taniguchi et al. | 165/42 |
| 5,427,313 | 6/1995 | Davis, Jr. et al. | 236/91 C |
| 5,511,724 | 4/1996 | Freiberger et al. | 236/91 F |
| 5,549,152 | 8/1996 | Davis, Jr. et al. | 236/91 C |

Primary Examiner—John K. Ford

[57] ABSTRACT

An automatic interior temperature control system for an automotive vehicle capable of controlling heat flux in response to changes in ambient temperature, outlet temperature, sun load and air flow by taking into account the relationship between these four variables in accordance with thermodynamic principles wherein an adjustment in heat flux corrects interior temperature error.

8 Claims, 6 Drawing Sheets

AUTOMATIC TEMPERATURE CONTROL METHOD AND APPARATUS FOR AN AUTOMOTIVE VEHICLE

TECHNICAL FIELD

This invention relates to a temperature control method and apparatus for maintaining a selected target temperature in a vehicle passenger compartment.

BACKGROUND ART

The interior heat content for an automotive vehicle is affected by a number of variables including the sun load heat flux ($Kw/m^2$), the effective glass area capable of transmitting a solar heat load, the heat generated by passengers and electronic devices within the vehicle passenger compartment, the ambient temperature of the air surrounding the vehicle, the mass air flow rate (enthalpy rate per degree), the average outlet temperature of the air conditioning system, and the heat transfer coefficient for heat transfer between the passenger compartment and the ambient air. An automotive temperature control system must take the thermodynamic interaction of these variables into account in an attempt to maintain a target interior temperature.

I am aware of prior art automatic climate control systems for vehicles that respond to variables including ambient temperature, interior temperature and radiant load in adjusting system outlet temperature. An example of such a prior art system may be seen by referring to U.S. Pat. No. 4,901,788.

Prior art climate control systems for vehicles, such as the one shown in the '788 patent, are capable of controlling the interior heat content by taking into account the difference in ambient temperature and the interior temperature of the vehicle, the difference in the outlet temperature of the climate control system and the interior temperature of the vehicle as well as heat generated by extraneous sources and solar heat load transmission, but such prior art systems do not take into account air flow. There is no attempt in such systems to control air flow in accordance with thermodynamic constraints for air flow and the other factors that affect heat flux, which may be expressed as kilowatts per kilogram per degree Kelvin. A proportional outlet temperature is developed by such systems in response to errors between a target temperature and the actual interior temperature and to variations in ambient temperature and solar heat load. Calibration of such systems requires at least three gain adjustments in the variables that affect outlet temperature. If the air flow should change, the gain factors must be recalibrated so that the relationship between air flow, ambient temperature, room temperature and other variables will conform to thermodynamic principles.

In a typical operating environment, for example, either more or less cooling is required depending upon whether the vehicle is unshaded or shaded. Conventional climate control systems attempt to adjust the outlet temperature to achieve a target interior temperature without taking into account the effect of air flow in the control of total heat load. They are designed to effect adjustment in the temperature of the system outlet, but there is no attempt to provide a quantifiable change in the total heat flux itself as the system attempts to achieve a target interior temperature.

SUMMARY OF THE INVENTION

It is the primary object of this invention to provide improved temperature control using a method and apparatus that take into account air flow as well as interior temperature, outlet temperature of the system and other general comfort parameters while managing the total heat flux for a given vehicle as thermal conditions change. It is possible using the teachings of my invention to provide precise control of two general comfort parameters, such as interior temperature and system outlet temperature, using a thermodynamic relationship that takes into account air flow. A subjective, empirical relationship between these variables can be calibrated readily using a functional relationship that is unique to each vehicle. A control logic for my invention then will balance the interior temperature by using the thermodynamic relationship between all pertinent variables, including air flow developed by a system blower.

PARTICULAR DESCRIPTION OF THE INVENTION

For the purpose of introducing a description of the features of my improved method and apparatus, I will describe generally the characteristics of a conventional proportional outlet temperature control for a vehicle temperature control system having ambient temperature input, interior temperature input and sun load input. It will be demonstrated with this introductory discussion that such conventional proportional outlet temperature control systems have inherent errors with respect to heat flux characteristics. These errors make it difficult to calibrate the system since separate control gains must be dealt with for each of the variables that are used to represent the heat flux characteristics. For example, each proportional gain factor must be adjusted independently of other variables during the system calibration for control of interior temperature. A proportional gain factor for ambient temperature variations must be dealt with empirically and separate proportional gain factors must be dealt with empirically to account for changes in sun load.

I will show in the discussion that follows that my improved process and apparatus will eliminate the errors that result from the relationship of the control variables used in conventional systems. Further, I will show that my improved process and apparatus make the task of calibrating and fine-tuning the system for a particular vehicle much easier and more precise.

In a climate control system for a vehicle, the energy balance relationship for the vehicle interior can be expressed as follows:

$$MC_r * dT_{r/dt} = K*(T_a - T_r) + C*(T_o - T_r) + Q_g + q_s * GA \qquad (1)$$

where:

$MC_r$ = the interior heat capacitance, $T_r$ = the room or cabin average temperature, $q_s$ = the sun load heat flux, GA = the effective glass area for solar load transmission, $Q_g$ = the heat generated by passengers, electronics, etc., $T_a$ = the ambient temperature (exterior surface), C = the mass air flow rate (enthalpy rate/degree), $T_o$ = the average outlet temperature, K = the conduction/convection heat transfer coefficient between the vehicle interior and ambient air, t = time.

If the vehicle heat flux relationship is constant, then the derivative of the room temperature with respect to time equals zero ($dT_{r/dt} = 0$). The heat flow equation then can be expressed as follows:

$$0 = K*(T_a - T_r) + C*(T_o - T_r) + Q_g + q_s * GA \qquad (2)$$

If the ambient temperature, the interior temperature and the sun load are in an equilibrium state, the conditions represented by these variables remains constant. Then, the energy balance equation can be separated into the following two component equations:

$$-K*(T_a - T_r) - Q_g - q_s * GA = \text{constant} \qquad (3)$$

$$C*(T_o - T_r) = \text{constant} \qquad (4)$$

Figure 1:
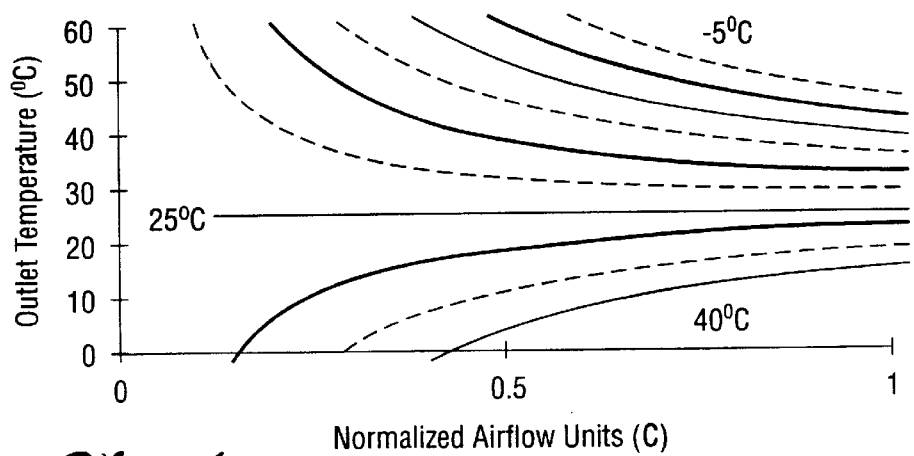
FIG. 1 shows generalized energy balance constraints for a typical climate control system for a vehicle wherein normalized air flow is plotted against system outlet temperature for various ambient temperatures (the interior temperature, in this case, is 25° C.)

As demonstrated by this equation, the combination of the air flow C, the interior temperature $T_r$, and the outlet temperature $T_o$ are constrained. FIG. 1 shows the constraint lines of the air flow C and the outlet temperature $T_o$ for various ambient temperatures. In the case of the condition of FIG. 1, the interior temperature is 25° C.

Figure 2:
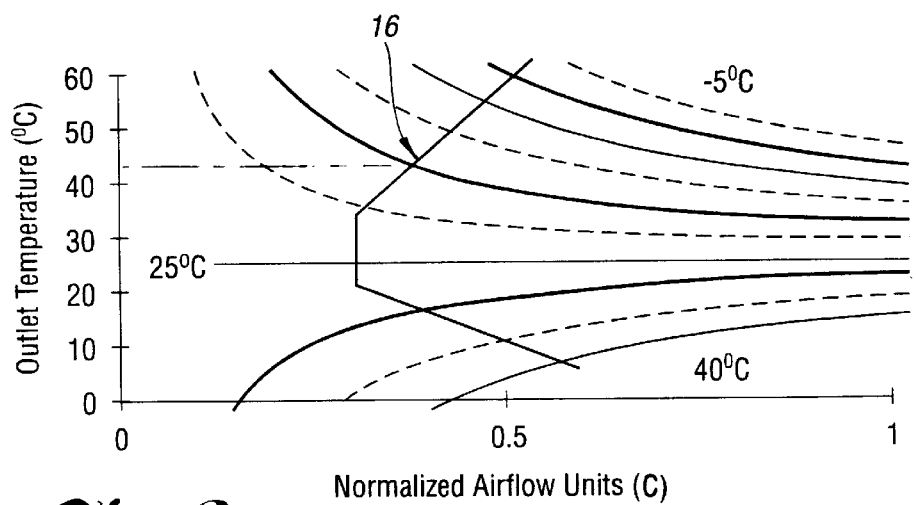
FIG. 2 shows the relationship of FIG. 1, but superimposed on it is an empirical relationship that indicates constraints imposed by human factors.

FIG. 2 shows a plot similar to the plot of FIG. 1, but superimposed on the plot of FIG. 2 is a relationship of air flow and outlet temperature that is derived from personal preferences and human factors. They represent empirical data for various comfort levels for the vehicle passengers.

In a conventional proportional control equation that does not take into account air flow, the outlet temperature would be calculated in accordance with the following equation:

$$T_o = G_1 *(\text{target} - T_r) - G_2 * T_a - G_3 * q_s + \text{offset} \qquad (5)$$

wherein:

$G_{1,2,3}$ = proportionality gains target = the intended interior temperature offset = an adjustment constant.

It is seen from Equation 5 that there are three separate proportionality gain factors $G_1$, $G_2$ and $G_3$. Each of these gain factors must be adjusted independently in order to provide a target interior temperature by changing $T_o$. These gain factors are non-linear as the air flow changes from one condition to the next. In the case of FIG. 2, for example, if the interior temperature is 25° C. and the sun load is 0 (the vehicle is in a shaded area) and the ambient temperature is 15°, an outlet temperature $T_o$ of 45° C. is calculated.

Figure 3:
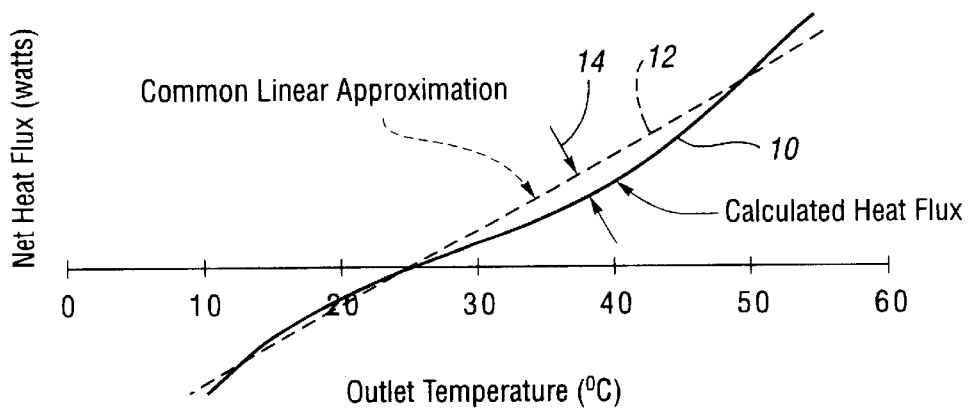
FIG. 3 is a plot of the net heat flux for various outlet temperatures that occur with human factor constraint air flow.

In FIG. 3 this relationship is shown by the non-linear heavy line 10. A common linear approximation used in prior art systems is illustrated by dotted line 12. It is seen that the actual heat flux and outlet temperature relationship deviates under most conditions from the commonly assumed linear approximation as shown at 14. This illustrates an undesirable shortcoming in the performance of conventional climate control systems.

Figure 4:
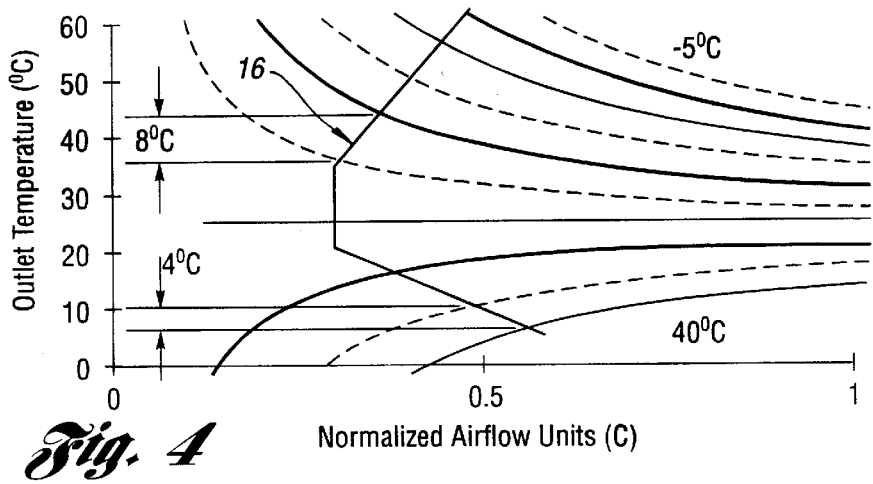
FIG. 4 is a plot similar to the plot of FIG. 2 showing outlet temperature gain sensitivity.

The human factor constraints that are indicated in FIG. 2 at 16 create the non-linear relationship illustrated in FIG. 3 when heat flux is determined for various outlet temperatures. This condition is illustrated in FIG. 4, which shows the different step adjustments in the outlet temperature that are required for equal steps in ambient temperature. For example, a given ambient temperature step for outlet temperatures below the target value of 25° C. would be much smaller (i.e., 4° C.) than the corresponding step (i.e., 8° C.) for outlet temperatures for a similar change in ambient temperature when the outlet temperature is higher than the target value of 25° C.

Figure 5:
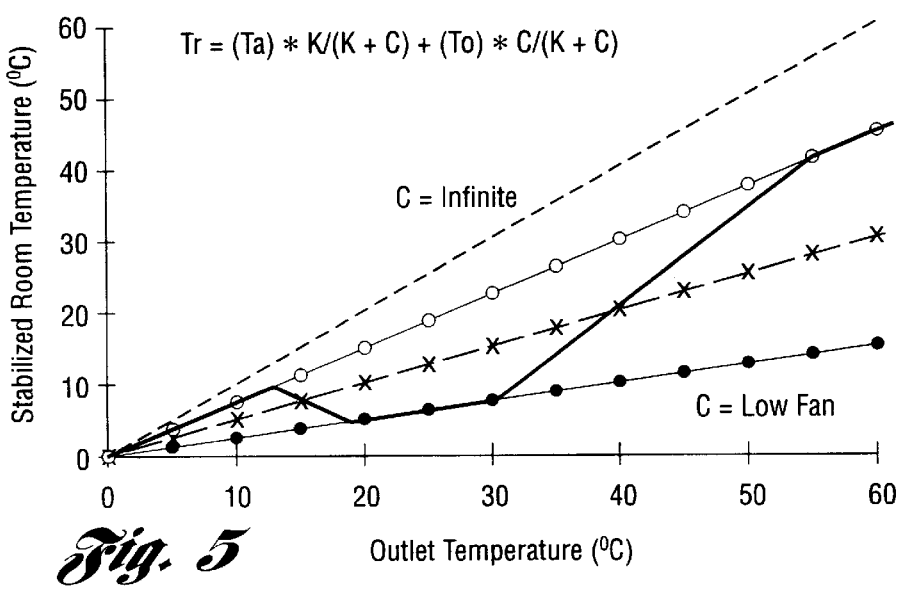
FIG. 5 is a plot of stabilized room temperature and outlet temperatures for various air flows under 0° C. no sun load condition.

The interaction of the interior temperature with other factors such as air flow is indicated in FIG. 5. The calibration and fine tuning of the air flow with a conventional system inherently causes interior temperature error. Thus, the system must be tuned during calibration each time an error exists. This requires a tedious adjustment of the multiple gain factors since air flow changes as interior temperature is adjusted to the target.

Figure 6:
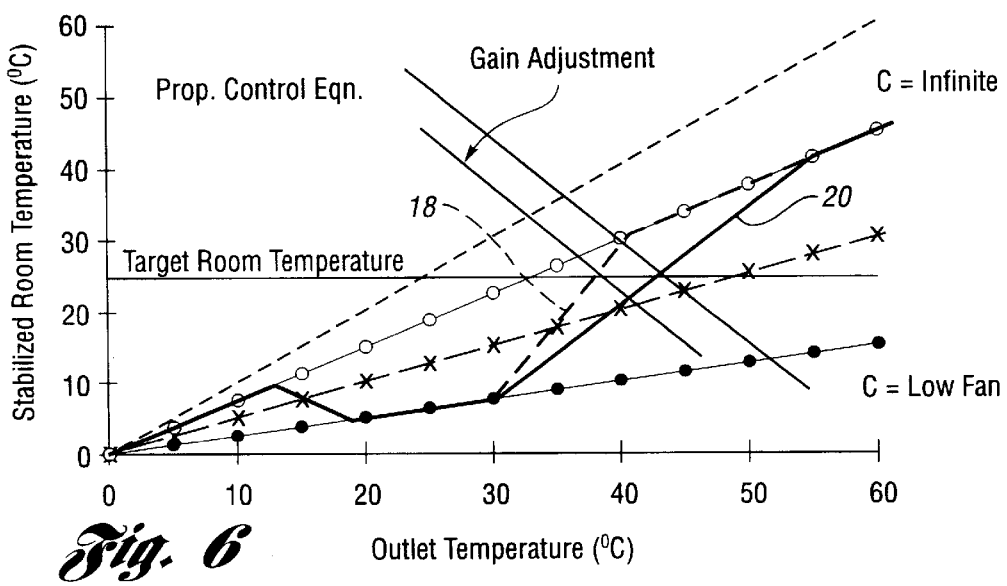
FIG. 6 is a plot of stabilized room temperature and outlet temperatures which indicates the gain adjustment that is needed if the air flow should be changed during calibration of the system under 0° C. no sun load condition.

The functions indicated in FIG. 6 show that there will be a unique output for each combination of inputs. Each time an input changes, a new outlet temperature must be calculated, the inputs being interior temperature, sun load, and ambient temperature. FIG. 6 shows also that multiple gain adjustments must be made. If the air flow is changed during calibration as indicated by the divergence of the dotted line 18 from the full line 20, adjustments to the gains are required. As indicated in the non-linear relationship shown in FIG. 3, these gains are not constant for every operating condition. This creates a time-consuming calibration operation.

In contrast to the relationship shown in FIG. 6, I have shown in the plot of FIG. 7 the influence of the heat flux control equation (6), described below, that is used in calibrating a system that embodies my invention. This equation, plotted at 22 in FIG. 7, uses heat transfer constants K and GA as the primary calibration values. K is a conduction/convention heat transfer coefficient between the ambient air and the vehicle interior air, and GA is the effective glass area for solar load transmission of heat.

The interaction between air flow tuning and the interior temperature is taken into account in this proportional control of the heat flux. It does this by combining all of the variables automatically. Once adjustments are made to the heat flow term, the heat flux relationship of my invention accounts automatically for variations in all of the other factors. Thus, the control equation used in practicing my invention inherently manages interior temperature without the necessity for making complex and tedious gain adjustments.

The equation for the outlet temperature in a system embodying my invention will react to changes in air flow to keep the interior temperature at a target value. By altering air flow, changes are made automatically in the way that the heat control equation behaves. Thus, on a hot, sunny day, if the air flow should be decreased, the outlet temperature will become colder in order to keep the target interior temperature at the desired level. In contrast to this, prior art control systems require the presence of an error in the interior temperature before a cooler outlet temperature can be supplied.

Figure 7:
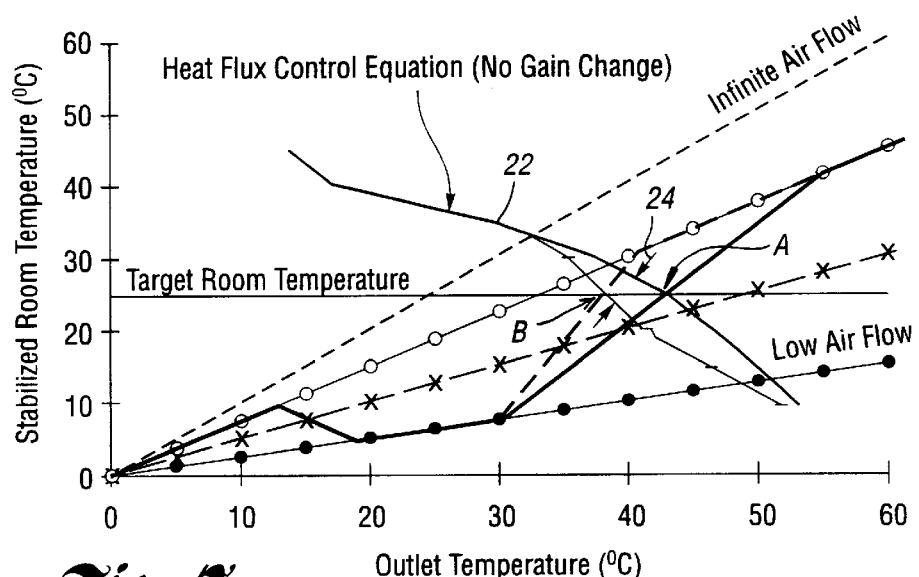
FIG. 7 shows the stabilized condition that is obtained when air flow changes as the target room temperature is maintained during calibration of the system under 0° C. no sun load condition.

The control equation of my invention, plotted in FIG. 7, is derived from the stabilized interior temperature; i.e.,:

$$T_r - [K^*T_a + C^*T_o + Q_g + q_s^*GA]/(K+C) \qquad (6)$$

Solving for the controlled heat flux ($C^*T_o$):

$$C^*T_o = -[K^*T_a + Q_g + q_s^*GA] + (K+C)^*T_r$$

then, $$T_o = (K/C+1) + T_r - K/C^*T_a - Q_g/C - (q_s^*GA/C)$$

Let $Q = Q_g + q_s^*GA$, $$T_o = T_r + [K^*(T_r - T_a) - (Q)]/C$$

The target interior value determines the stabilized outlet temperature. An error term provides a consistent heat flux gain for proportional corrections as demonstrated by the following equation:

$$T_o = G_1^*(\text{target} - T_r)/C + \text{target} + [K^*(\text{target} - T_a) - (Q)]/C \qquad (7)$$

If no error exists, that is, if the interior temperature equals target temperature, the outlet temperature is calculated from the energy balance equation. If the air flow is changed during calibration to produce the divergence indicated at 24 in the plot of FIG. 7, the stabilized room temperature condition will be maintained. This is indicated by the intersection of line 22 with the target room temperature line at point "A" and the corresponding intersection point after an air flow calibration change, as shown at point "B".

In FIG. 7, if the gain factor $G_1$ in Equation (7) should remain constant, the heat flux control equation plotted with the heavy line 22 will intersect the 25° room temperature line at an outlet temperature of about 42°. The corresponding outlet temperature following air flow adjustment is about 37° C. as shown in FIG. 7.

Figure 8:
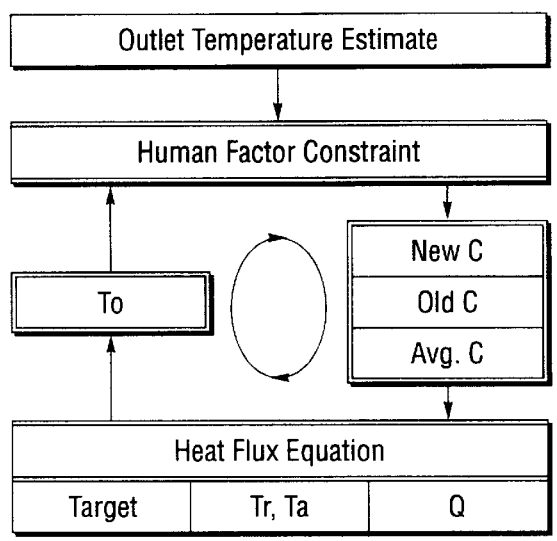
FIG. 8 is a diagram of the tuning adjustments in the heat flux relationship during computerized self-calibration of the system as changes are made in the air flow as indicated in FIG. 7.

FIG. 8 shows schematically how the human factor constraint lines can be combined with iterative search logic using successive substitutions of values for flow to derive the desired outlet temperature that will maintain the target room temperature. For purposes of illustration, I have illustrated in the following table various human constraint factors that are imposed on the control system.

TABLE 1

| Blower Voltage | Outlet Temperature (C). | Air Flow Normalized |
|---|---|---|
| 12 | 3 | 1 |
| 8 | 10 | 0.7 |
| 6 | 17 | 0.4 |
| 4 | 24 | 0.2 |
| 5 | 31 | 0.25 |
| 6 | 38 | 0.3 |
| 7 | 45 | 0.4 |
| 8 | 52 | 0.6 |
| 9 | 59 | 0.7 |
| 10 | 66 | 0.8 |
| 11 | 73 | 0.85 |
| 12 | 80 | 0.9 |
| 12 | 87 | 0.9 |

The air flow and the outlet temperature relationship is used to constrain heat flux for target interior temperatures that are selected using the logic of my invention. The correct heat flux for the constraints being determined, the target interior temperature can be obtained automatically, thereby avoiding the need for tuning ambient temperature and solar gain factors to match the necessary heat flux in the control of interior temperature.

Table 1 shows an example of the various blower voltages, outlet temperatures and the normalized air flow that may be used taking into consideration the human constraint factors.

If the target interior temperature is selected at 25° C., and if it is assumed that the steady-state heat load is 10, then:

$$10 = K^*(T_a - \text{Target}) + Q_{sun} \qquad (8)$$

At thermal equilibrium:

$$C^*(\text{Target} - T_o) = 10 \qquad (9)$$

The outlet temperature calculated using the heat flux control equation is as follows:

$$T_o = G_1^*(\text{Target} - T_r)/C - 10/C + \text{Target} \qquad (10)$$

A typical example of the iterations that are needed to establish a target value for interior temperature is illustrated in the following table:

TABLE 2

| Calc. Cycles | Old Air Flow | Calc. Outlet | New Air Flow |
|---|---|---|---|
| 0 | 0.900 | 13.889 | 0.533 |
| 1 | 0.827 | 12.903 | 0.576 |
| 2 | 0.776 | 12.121 | 0.609 |
| 3 | 0.743 | 11.541 | 0.634 |
| 4 | 0.721 | 11.134 | 0.651 |
| 5 | 0.707 | 10.860 | 0.663 |
| 6 | 0.698 | 10.682 | 0.671 |
| 7 | 0.693 | 10.568 | 0.676 |
| 8 | 0.689 | 10.495 | 0.679 |
| 9 | 0.687 | 10.450 | 0.681 |
| 10 | 0.686 | 10.422 | 0.682 |
| 11 | 0.685 | 10.405 | 0.683 |
| 12 | 0.685 | 10.394 | 0.683 |

The "old" flow for Table 2 is set equal to a value of 0.9, assuming the normalized air flow is 1. Also, the interior temperature is at the target value. Repeated calculations of $T_o$, using a multiplier of M=0.2, are shown in the table. In the table, the value for "new" air flow is interpolated from the air flow outlet temperature table. The differences in the values for the old air flow and the new air flow initially are large at the beginning of the calculation cycles, but these values converge upon completion of the twelfth calculation cycle. For example, $$OLD(12)=OLD(11)+M*(NEW(11)-OLD(11)). \quad (11)$$

FIG. 8 shows the computerized self-calibration process. An estimate of the outlet temperature and human factor constraint considerations are imposed on the control equation, and a new air flow C is calculated and compared to an old air flow C in a previous calculation cycle using the heat flux control equation. A new value for $T_o$ is calculated during each cycle until the values for old air flow and new air flow converge, as indicated in Table 2. FIG. 8 illustrates the technique that is used in creating the calibration chart of FIG. 7.

Figure 9:
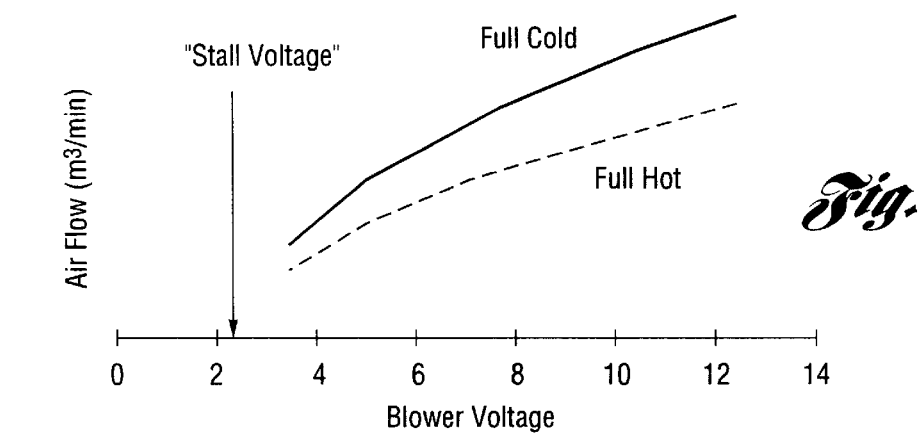
FIG. 9 is a typical air flow and blower voltage relationship for the system.

FIG. 9 shows a typical air flow performance chart for a conventional blower. Voltage at which no significant air flow is delivered is called the "stall" voltage.

Figure 12:
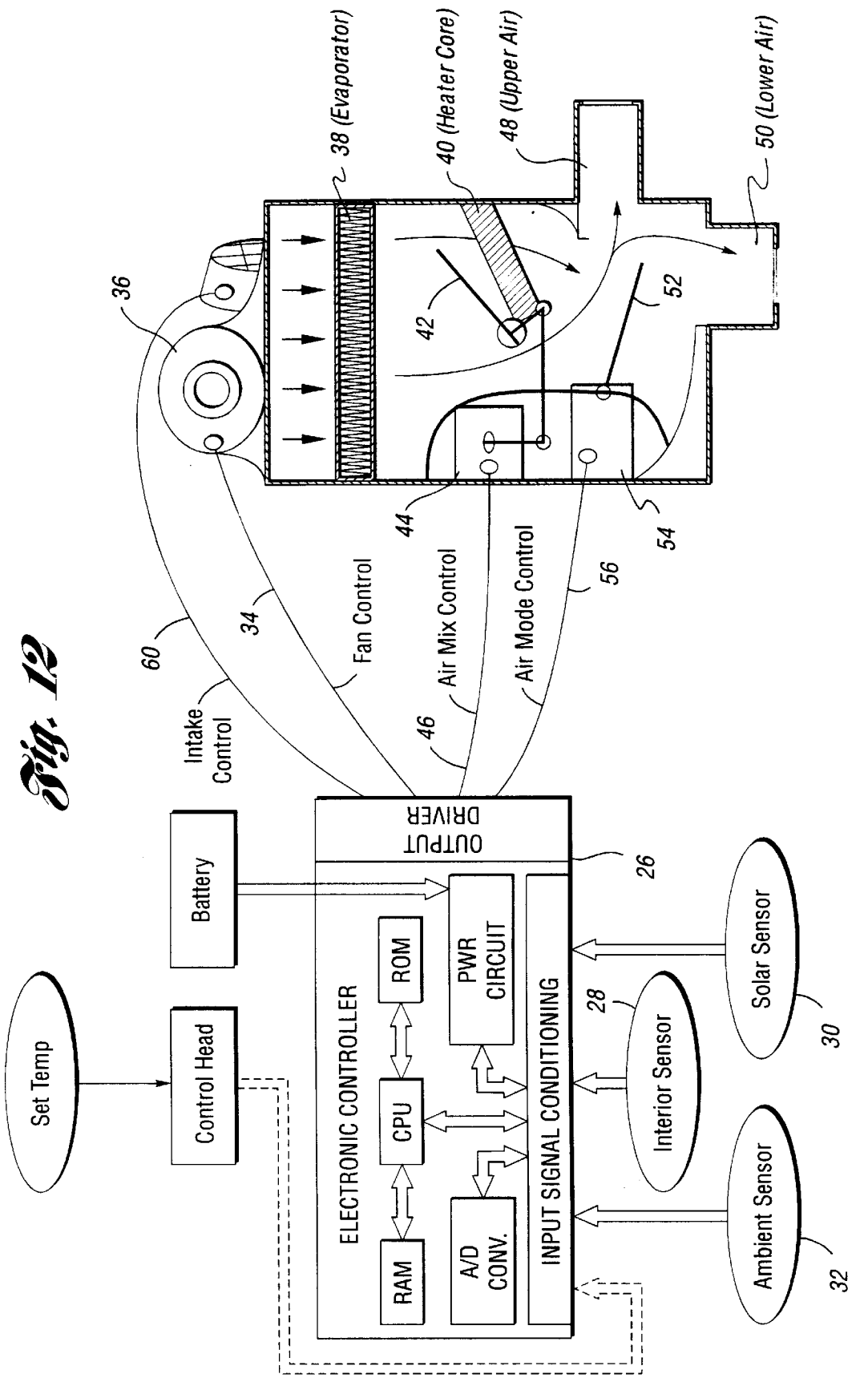
FIG. 12 is a schematic representation of an overall vehicle installation of a climate control system capable of embodying the improvements of my invention.

FIG. 12 is a schematic diagram of the overall system. It includes an electronic microprocessor controller 26 which receives a temperature signal from an interior air temperature sensor 28. It also receives signals from a solar heat sensor 30 and an ambient air temperature sensor 32. Controller 26 will develop a voltage, as shown at 34, for controlling the speed of the blower 36 as air is passed by the blower over evaporator 38 and heater core 40. In a conventional fashion, the air flow that passes over the heater core 40 can be controlled by a blend door 42, the opening of which is controlled by an air mix controller 44. The processor 26 in a conventional fashion will activate the blend door as indicated schematically at 46.

Air is distributed to the upper control panel area as shown at 48 or to the lower floor area of the vehicle as shown at 50, depending upon the position of door 52, which is under the control of an air mode controller 54. The controller 26 activates the air mode control 54 as shown at 56.

The vehicle operator may set the desired temperature with a conventional control head, the output of which is distributed to the controller as an input.

Intake air is also determined by the electronic controller 26, as indicated by control line 60.

The electronic controller may be one of a variety of known digital microprocessors (e.g., an 8-bit, single-chip microcomputer). It includes a read-only memory (ROM) in which the heat flux control equation is stored. It has the usual random-access memory registers (RAM) that receive information from the sensors before it is fetched by the central processor unit (CPU) and used by the CPU logic to act upon the stored equation in ROM to produce an output for the driver circuits. In known fashion, the processor monitors the sensor information during successive control loops as it performs sequentially the process steps that are subsequently described in FIGS. 10 and 11, as well as elsewhere in this description.

Figure 10:
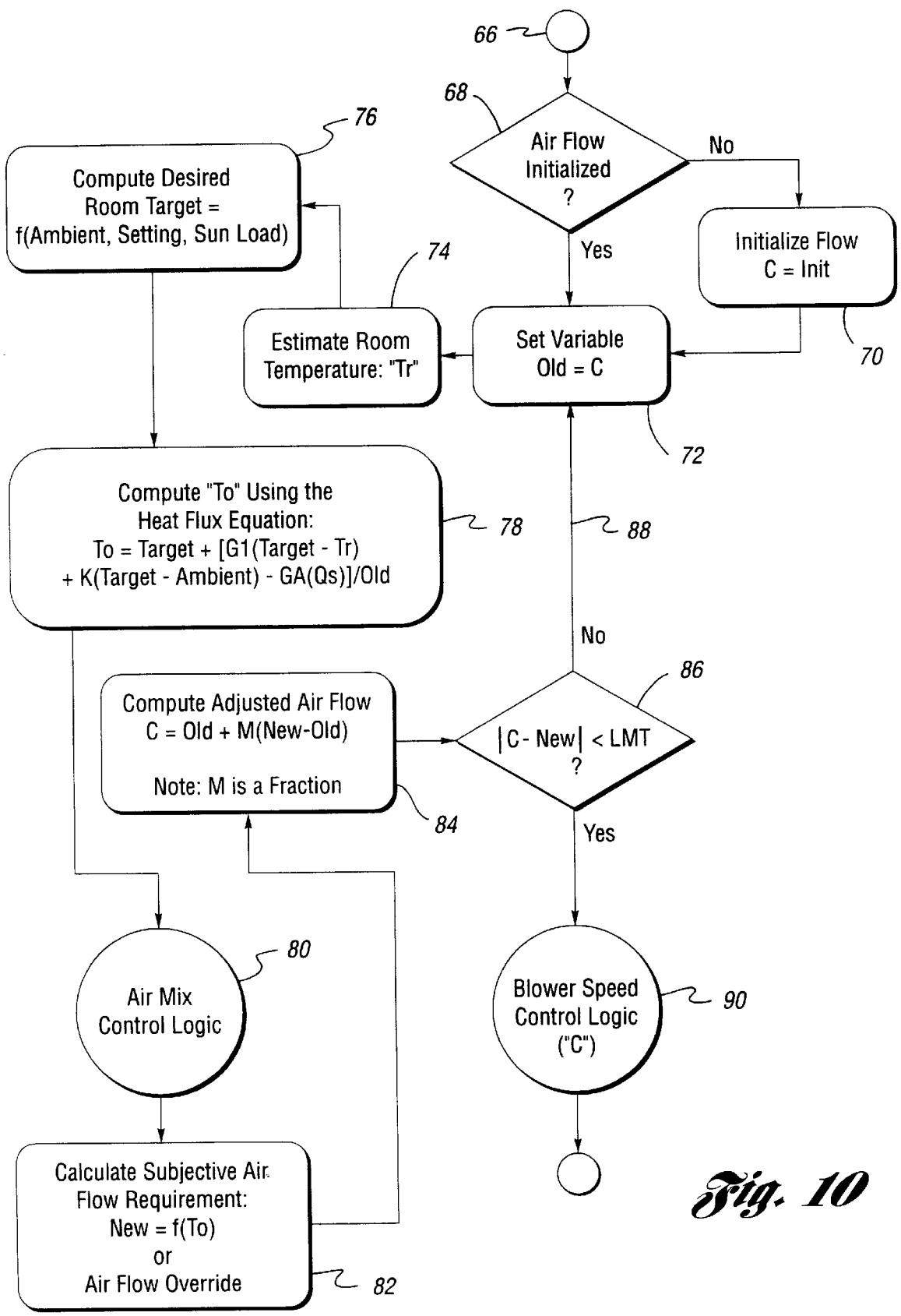
FIG. 10 is a logic flow chart illustrating the process steps that are used in balancing interior temperature using specified combinations of outlet temperature and air flow.

FIG. 10 shows a flow diagram that illustrates the control steps for carrying out the control process of my invention. The subjective requirements discussed above are contained in functions that are unique for each vehicle. The target interior temperature and the relationship of air flow and outlet temperature are contained in these functions. The control logic will balance interior temperature by using the specified outlet and air flow. The air flow that is desired is initialized at 66 in FIG. 10. An inquiry is made at 68 as to whether the initialization of flow is completed. If it is not completed, the process will proceed to action block 70, calling for the initialization of the air flow. If it is completed, the process will proceed directly to action block 72 where the old flow value will be set. The interior temperature value $T_r$ then will be estimated at 74 and, using that estimated interior temperature value, desired interior temperature is computed at 76 taking into account ambient temperature, setting and sun load. A new target value then is computed. The routine then proceeds to action block 78 where the outlet temperature is computed using the heat flux equation, which is stored in ROM as indicated above. This is followed by the usual air mix control logic routine that occurs in the microprocessor, as indicated at 80.

The subjective air flow requirement is calculated at 82 to determine the new air flow. An adjusted air flow then is calculated at 84 as described previously. An inquiry then is made at 86 to determine whether the difference between the new air flow and the old air flow is less than a limit that is determined by calibration. If it is not less than that limit, the routine then will be repeated as the function flow shown at 88 returns to action block 72. The routine will repeat itself until the difference between the old air flow and the new air flow is less than a certain limit. At that time, the logic then will cause an adjustment in blower speed.

Figure 11:
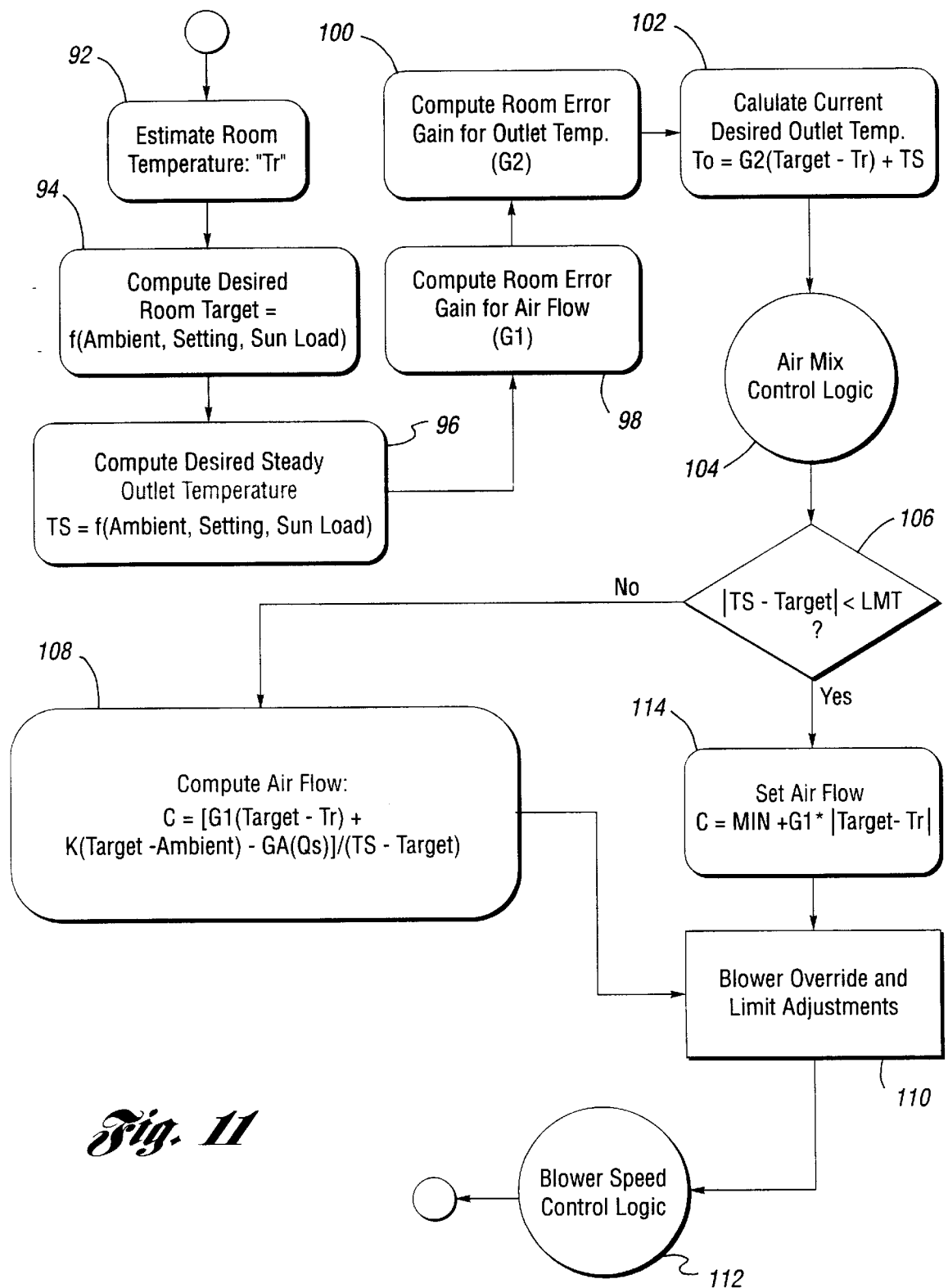
FIG. 11 is a flow chart similar to the flow chart of FIG. 10 but which includes transient flexibility for optimizing passenger compartment comfort during warm-up or cool-down as the blower speed is adjusted separately.

The routine of FIG. 11 essentially is similar to that of FIG. 10, but it will allow for an additional specification of air flow and outlet temperature at steps 98 and 100. After interior temperature is estimated at action block 92, the routine will proceed to compute the desired interior temperature at 94 by taking into account ambient air temperature, temperature setting, and the sun load. The computation of the desired steady state outlet temperature (TS) then is computed at 96 and the routine will proceed to compute interior temperature error gain for air flow as shown at 98. An interior temperature error gain for outlet temperature is computed at 100. Those values are used to calculate current desired outlet temperature, as indicated at 102. That value is used by the air mix control logic indicated at 104.

At 106, a test is made to determine whether the steady state outlet temperature TS minus target temperature is less than a calibrated limit. If it is not less than a calibrated limit, then air flow is computed at action block 108. Using the relationship indicated in FIG. 11, the operator then may override the automatic system by manually adjusting blower speed as indicated at 112, which triggers the blower speed control logic 110. On the other hand, if the difference between the computed desired steady state outlet temperature determined at 96 minus the target value indeed is less than a calibrated limiting value, the routine will bypass the action blocks 108 and 110 and proceed directly to set an air flow value at 114.

Having described a preferred embodiment of my invention, what I claim and desire to secure by U.S. Letters Patent is:

1. An automatic temperature control method for maintaining a selected target temperature in a vehicle passenger compartment having a temperature control system, said system including an evaporator, a heater core, blower for moving air over said evaporator and said heater core, and an electronic processor having a memory, said method comprising:

storing in said memory a heat flux control equation for determining heat flux (kilowatts) for said air moved by said blower as a function of variables including ambient air temperature, outlet air temperature for said system, vehicle interior temperature, sun load and air flow rate (enthalpy rate/degree);

monitoring vehicle interior temperature, ambient air temperature and sun load; and determining said outlet temperature by controlling heat flux with predetermined constraints on the relationship of said outlet temperature and air flow rate whereby an equilibrium condition is maintained as a thermodynamic energy balance is established.

2. The method set forth in claim 1 wherein said constraints include human constraint factors that modify thermodynamic constraint factors in the relationship of air flow and said outlet temperature, said constraint factors being stored in said processor memory where they are addressable repetitively in response to incremental changes in said variables to effect a change in heat flux that will result in a modification in said outlet temperature.

3. An automatic temperature control method comprising maintaining a selected target temperature in a vehicle passenger compartment having a temperature control system, said system including an evaporator, a heater core, a blower for moving air over said evaporator and said heater core, and an electronic processor memory storing a heat flux (kilowatts) control equation expressed, when an energy balance exists, as:

$$T_o = G_1*(target - T_r)/C + target + [K*(target - T_a) - Q]/C$$

where:

To=outlet temperature,

Tr=vehicle interior temperature,

C=the mass air flow rate (enthalpy rate/degree),

K=conduction/convection heat transfer coefficient between the vehicle interior and ambient air, Ta=ambient air temperature, Q=the combined heat load comprising sun load and extraneous heat sources (GA*qs+Qg) with qs=the measured sun load, GA=the effective solar load transmission effect (Glass area) and Qg=heat generated by sources such as passengers and vehicle electronics, and G1=gain factor;

determining with said heat flux control equation the heat flux for said air moved by said blower as a function of variables including ambient air temperature, outlet air temperature for said system, vehicle interior temperature, sun load and air flow rate; and determining said outlet temperature by controlling heat flux with predetermined constraints on the relationship of said outlet temperature and air flow maintained automatically.

4. The method set forth in claim 3 wherein said constraints include human constraint factors that modify thermodynamic constraint factors in the relationship of air flow and said outlet temperature, said constraint factors being stored in said processor memory where they are addressable repetitively in response to incremental changes in said variables to effect a change in heat flux that will result in a modification in said outlet temperature.

5. An automatic temperature control apparatus for maintaining a selected target temperature in a vehicle passenger compartment comprising:

an air blower for moving air in an air flow path, said air flow path being defined in part by an air flow outlet port in said passenger compartment;

an evaporator and a heater core in said air flow path, an air mix controller including an adjustable blend door in said air flow path, said blend door varying the proportion of the total air flow that passes through said heater core as said blend door is adjusted;

an electronic processor having a memory storing a heat flux control equation for determining heat flux for said air as a function of variables including ambient air temperature, outlet port air temperature, passenger compartment air temperature, sun load and air flow rate;

said electronic processor including means for controlling said air blower to effect adjustments in said air flow in accordance with values of heat flux within predetermined calibration constraints on the relationship of said outlet port air temperature and air flow rate whereby an equilibrium condition is maintained as a thermodynamic energy balance is established.

6. The apparatus as set forth in claim 5 wherein said heat flux control equation is expressed as:

$$T_o = G_1*(target - T_r)/C + target + [K*(target - T_a) - Q]/C$$

where:

$T_o$=outlet temperature, $T_r$=vehicle interior temperature,

C=the mass air flow rate (enthalpy rate/degree),

K=conduction/convection heat transfer coefficient between the vehicle interior and ambient air, $T_a$=ambient air temperature, Q=the combined heat load of sun load and extraneous heat sources (GA*qs+Qg) with qs=the measured sun load, GA=the effective solar load transmission effect (Glass area) and Qg=heat generated by sources such as passengers and vehicle electronics, $G_1$=gain factor.

7. The apparatus as set forth in claim 5 wherein said heat flux control equation is expressed, when an energy balance exists, as:

$$T_o = G_1*(target - T_r)/C + target + [K*(target - T_a) - Q]/C$$

where:

To=outlet temperature,

Tr=vehicle interior temperature,

C=the mass air flow rate (enthalpy rate/degree),

K=conduction/convection heat transfer coefficient between the vehicle interior and ambient air, Ta=ambient air temperature, Q=the heat load including sun load, and G1=gain factor.

8. An automatic temperature control method for maintaining a selected target temperature in a vehicle passenger compartment having a temperature control system, said system including an evaporator, a heater core, a blower for moving air over said evaporator and said heater core, and an electronic processor memory storing a heat flux (kilowatts) control equation expressed, when an energy balance exists, as:

$$T_o = G_1*(\text{target} - T_r)/C + \text{target} + [K*(\text{target} - T_a) - Q]/C$$

where:

To = outlet temperature,
Tr = vehicle interior temperature,
C = the mass air flow rate (enthalpy rate/degree),
K = conduction/convection heat transfer coefficient between the vehicle interior and ambient air,
Ta = ambient air temperature,
Q = the heat load including sun load,
G1 = gain factor;

determining with said heat flux control equation heat flux for said air moved by said blower as a function of variables including ambient air temperature, outlet air temperature for said system, vehicle interior temperature, heat load and air flow rate; and determining said outlet temperature by controlling heat flux with predetermined constraints on the relationship of said outlet temperature and air flow maintained automatically.

* * * * *